United States Patent Office 3,297,782
Patented Jan. 10, 1967

3,297,782
COATING COMPOSITION OF POLYOXYALKYLENE ETHER OF A 2-ALKYLIDENE DIPHENOL ESTERIFIED WITH FUMARIC OR MALEIC ACID, AND A POLYGLYCIDYL ETHER OF A DIHYDRIC PHENOL
Edward Barkis, Philadelphia, Pa., and William I. Tinz, New Castle, Del., assignors to Avisun Corporation, Philadelphia, Pa., a corporation of Delaware
No Drawing. Filed Mar. 3, 1964, Ser. No. 349,132
7 Claims. (Cl. 260—835)

This invention relates to a composition for coating flexible base sheets and composite heat-sealable, moisture-proof films prepared therewith.

When, for example, uncoated, oriented polypropylene film is heat sealed, excessive shrinkage causes unsightly joints. Unoriented polypropylene film requires excessive heat to produce a tight seal and renders the film unsuitable for conventional regenerated cellulose film packaging equipment. Certain other thermoplastic films, e.g., polyethylene terephthalate, provide similar heat-sealing problems.

Coating these oriented and unoriented thermoplastic films with a composition which will melt at a suitable, lower temperature is a means of overcoming the heat-sealing problem. However, development of suitable compositions for this purpose is difficult since adhesion of the coating to the base is not easily obtained.

It is an object of this invention to provide a coating composition for application to non-fibrous flexible base sheets.

It is another object of this invention to provide a composite packaging sheet which is heat-sealable when used with conventional packaging machinery.

These and other objects are accomplished in accordance with this invention wherein a coating composition comprises a solvent solution of a mixture of (1) a major proportion of a curable polyester resin having a melting point of at least 90° C. up to about 120° C., preferably 100 to 110° C., comprising the esterification product of a polyoxyalkylene ether of a 2-alkylidene diphenol wherein the alkylene radical has 2 to 3 carbon atoms and the alkylidene radical has 3 to 4 carbon atoms, with fumaric or maleic acid, and (2) at least 10% based on the weight of the mixture of a curable, liquid bisphenol-epichlorohydrin resin.

The curable polyester resin for this invention is described in U.S. 2,634,251. In general, the resin is prepared with conventional esterification techniques using, for example, polyoxyethylene ether of sec-butylidene diphenol, polyoxyethylene ether of isopropylidene diphenol, polyoxypropylene ether or sec-butylidene diphenol, or polyoxypropylene ether of isopropylidene diphenol reacted with fumaric acid or maleic acid. The anhydride of maleic acid is, of course, also used. The polyester resin is preferably used in amounts ranging from 60 to 80% based on the weight of the mixture.

The liquid, curable bisphenol-epichlorohydrin resin is preferably prepared by reacting conventional bisphenol A (p,p'-isopropylidene diphenol) or bisphenol B (p,p'-sec-butylidene diphenol) with an excess of epichlorohydrin. This type of epoxide resin is commercially available from several manufacturers and is preferably used in amounts ranging from 20 to 40% based on the weight of the mixture.

Solvents for the above-described mixture include, for example, inexpensive hydrocarbon solvents such as toluene and benzene as well as other organic solvents such as butyl acetate, tetrahydrofuran and the like. In general, the coating solution contains from about 5 to 30% solids and preferably from about 10 to 20% solids based on the weight of the solution.

Surface modifying agents may also be incorporated in the coating composition. Clays and waxes to improve slip and antiblocking properties are usually each incorporated in amounts up to about 4% based on the weight of the resin mixture.

The coating composition of this invention is preferably applied to polyolefin films, e.g., polypropylene, but other flexible polymer base sheets are also used. Other base materials include polyester, polyamide, polycarbonate and regenerated cellulose sheets. These base sheets are advantageously pretreated to improve adhesion between the coating and the base film. Anchoring treatment includes extremely thin coatings of well known anchoring resins, acid treatment or electrical discharge treatment of the film.

The following example is set forth to demonstrate this invention.

Example

The following ingredients are incorporated in a mixture of 50 parts toluene and 50 parts butyl acetate to produce a solution having a solids concentrations of 15%.

|  | Wt. percent |
| --- | --- |
| Curable polyoxyethylene isopropylidene diphenol reacted with fumaric acid | 71 |
| p,p'-Isopropylidene diphenol-epichlorohydrin curable liquid resin | 25 |
| Clay dispersion | 2 |
| Paraffin wax | 1 |
| Microcrystalline hydrocarbon wax | 1 |

The coating solution is applied to the surface of an electrically treated biaxially oriented polypropylene film and dried. The resulting clear coating adhered strongly to the base and produced strong, neat heat seals with conventional heat-sealing equipment and temperature.

The individual resin components of this coating composition are conventionally cured to the non-heat-sealable thermoset state. However, in the present application and in the given combination they remain thermoplastic and provide excellent coating properties as well as heat-sealability.

Various changes and modifications may be made practicing the invention without departing from the spirit and scope thereof and, therefore, the invention is not to be limited except as defined in the appended claims.

We claim:
1. A coating composition comprising a solvent solution of a mixture of (1) a major proportion of a curable polyester resin having a melting point of at least 90° C. up to about 120° C. comprising the esterification product of a polyoxyalkylene ether of a 2-alkylidene diphenol wherein the alkylene radical contains from 2 to 3 carbon atoms and the alkylidene radical has from 3 to 4 carbon atoms with an acid from the group consisting of fumaric and maleic, and (2) at least 10% based on the weight of the mixture of a curable, liquid bisphenol-epichlorohydrin resin.

2. A coating composition comprising a solvent solution of a mixture of (1) a major proportion of a curable polyester resin having a melting point of at least 100° C. and up to 110° C. comprising the esterification product of a polyoxyethylene ether of isopropylidene diphenol with fumaric acid, and (2) at least 10% based on the weight of the mixture of a curable, liquid bisphenol-epichlorohydrin resin.

3. A coating composition comprising a solvent solution of (1) a mixture of a major proportion of a curable polyester resin having a melting point of at least 100° C. up to 110° C., comprising the esterification product of a polyoxyethylene ether of sec-butylidene diphenol with fumaric acid, and (2) at least 10% based on the weight and mixture of a curable, liquid bisphenol-epichlorohydrin resin.

4. A composite sheet comprising a non-fibrous, flexible, polymer base sheet having a coating on at least one side thereof comprising a mixture of (1) a major proportion of a curable polyester resin having a melting point of at least 90° C. up to 120° C. comprising the esterification product of a polyoxyalkylene ether of a 2-alkylidene diphenol wherein the alkylene radical contains from 2 to 3 carbon atoms and the alkylidene radical has from 3 to 4 carbon atoms with an acid from the group consisting of fumaric and maleic, and (2) at least 10% based on the weight of the mixture of a curable, liquid bisphenol-epichlorohydrin resin.

5. The composite sheet of claim 4 wherein the polyester resin is the esterification product of polyoxyethylene ether of isopropylidene diphenol with fumaric acid.

6. The composite sheet of claim 4 wherein the polyester resin is the esterification product of polyoxyethylene ether of sec-butylidene diphenol with fumaric acid.

7. The composite sheet of claim 4 wherein the base sheet is polypropylene.

References Cited by the Examiner
UNITED STATES PATENTS

| | | | |
|---|---|---|---|
| 2,634,251 | 4/1953 | Kass | 260—871 |
| 2,961,427 | 11/1960 | Walten | 260—835 |

MURRAY TILLMAN, *Primary Examiner.*

P. LIEBERMAN, *Assistant Examiner.*